United States Patent
Ogiri et al.

[11] Patent Number: 5,165,180
[45] Date of Patent: Nov. 24, 1992

[54] ON-LINE DRYING CONTROL METHOD FOR POWDERED OR GRANULAR MATERIALS AND A SYSTEM TO EXECUTE THE METHOD

[75] Inventors: Hiroshi Ogiri, Kanagawa; Kazue Murata, Nara; Sadaaki Tanaka, Osaka, all of Japan

[73] Assignee: Kabushiki Kaisha Matsui Seisakusho, Osaka, Japan

[21] Appl. No.: 557,864

[22] Filed: Jul. 26, 1990

[30] Foreign Application Priority Data

Aug. 1, 1989 [JP] Japan .................. 1-201050

[51] Int. Cl.⁵ .............. F26B 21/06; F26B 19/00; F26B 21/00
[52] U.S. Cl. .......................... 34/46; 34/48; 34/56; 34/54; 34/89; 34/174
[58] Field of Search ............ 34/46, 48, 50, 54, 56, 34/89, 174

[56] References Cited

U.S. PATENT DOCUMENTS

| | | | |
|---|---|---|---|
| 3,673,700 | 7/1972 | Schabbel | 34/89 |
| 4,022,560 | 5/1977 | Heinonen | 34/46 X |
| 4,043,050 | 8/1977 | Hancock | 34/48 |
| 4,144,012 | 3/1979 | Pinkley | 34/54 X |
| 4,578,878 | 4/1986 | Mizuta et al. | 34/48 X |
| 4,660,298 | 4/1987 | Nambu et al. | 34/46 X |
| 4,665,629 | 5/1987 | Cramer | 34/54 |
| 4,773,168 | 9/1988 | Lamos et al. | 34/174 X |
| 4,896,795 | 1/1990 | Ediger et al. | 34/56 X |
| 4,924,601 | 5/1990 | Bercaw | 34/46 |

*Primary Examiner*—Albert J. Makay
*Assistant Examiner*—Christopher B. Kilner
*Attorney, Agent, or Firm*—Jones, Tullar & Cooper

[57] ABSTRACT

An on-line drying control method for powdered or granular materials and a related system to execute the method. A fixed amount of materials stored and dried in a drying means such as a hopper dryer is sampled, transported into a moisture measuring/operating station wherein the sampled materials are heated in a heat treatment chamber and the moisture content is calculated by an operation unit. The moisture content is sent to a temperature controller to control the temperature of the drying means so that the obtained moisture content corresponds to a predetermined moisture content while comparing both moisture contents.

10 Claims, 5 Drawing Sheets

ON-LINE DRYING CONTROL METHOD FOR POWDERED OR GRANULAR MATERIALS AND A SYSTEM TO EXECUTE THE METHOD

CROSS-REFERENCE TO RELATED APPLICATION

This application is related to copending application, Ser. No. 07/557,865, filed Jul. 26, 1990.

BACKGROUND OF THE INVENTION

1. Field of the Invention

The present invention relates to a newly constructed on-line drying control method for powdered or granular materials including inorganic materials such as resin and ceramic and to an on-line drying control system for such materials, wherein materials stored and dried in a drying means such as a hopper dryer are automatically sampled and quickly measured for their moisture content, and the temperature of the drying means is controlled based on the obtained result.

2. Prior Art

Generally, keeping the moisture content materials constant has presented a most important problem to maintain good quality of the resin products because an inappropriate moisture content of the resin materials to be supplied into a molding machine causes defects in the products, such as a silver line or a void. Therefore, resin materials are usually dried by the use of a hopper dryer before being supplied into the molding machine.

However, resin materials are apt to absorb moisture in the air before being fed into the hopper dryer while stored in a silo or a tank of intermediate stage for a fixed period of time after a kraft bag or a flexible container which is used to carry resin materials is opened. Accordingly a fixed heating temperature and a fixed heating time are set for the hopper dryer based on an estimated moisture content of the resin materials. But such a conventional method for drying resin materials by the use of a hopper dryer leaves further room for improvement in saving labor to achieve the most appropriate drying method as the heating of materials is controlled based on an estimation without sufficiently understanding the conditions of the resin materials before heated.

SUMMARY OF THE INVENTION

An object of the present invention is to provide an on-line drying control method for powdered or granular materials wherein a fixed amount of materials is automatically sampled, the moisture content thereof measured by feeding into a moisture measuring/operating station and the temperature of the drying means is controlled based on the measured moisture content, and to provide an on-line drying control system for such materials.

An on-line drying control method for powdered or granular materials according to the present invention proposed to achieve the above-mentioned objects is characterized by executing the following steps, sampling the materials stored and dried in a drying means such as a hopper dryer, transporting the materials into a heat treatment chamber provided with an airtight heating means in a moisture measuring/operating station, heating the materials in the heat chamber while a pressurized and dried inert gas is fed thereinto, supplying the moisture generated from the materials into a moisture measuring unit together with the inert gas, calculating the moisture content of the materials by repeating the above-mentioned steps each time the materials are sampled from the drying means, controlling the temperature of the drying means so that the obtained moisture content of the materials corresponds to a predetermined moisture content while comparing both moisture contents.

An on-line drying control system for powdered or granular materials proposed according to the present invention to execute the above-mentioned control method is characterized in that the system comprises a drying means such as a hopper dryer for storing the materials to be dried; a moisture measuring/operating station including a sampling means to sample automatically a fixed amount of materials dried in the drying means, a heat treatment chamber provided with an airtight heating means to heat the sampled materials, a moisture measuring unit which titrates and analyzes the moisture evaporated from the materials by means of a titration reagent such as a Karl Fischer reagent, a weight measuring unit to measure the sampled materials, and an operation unit which calculates the titrated value obtained by the moisture measuring unit and the weight value measured by the weight measuring unit to get the moisture content of materials, and a temperature controller to control the temperature of the drying means so that the moisture content of the sampled materials obtained by the moisture measuring/operating station corresponds to a predetermined moisture content while comparing both moisture contents each time materials are sampled from the drying means.

And, an on-line drying control system for powdered or granular materials proposed to achieve the objects according to the present invention is further characterized in that the system comprises a drying means such as a hopper dryer for storing the materials to be dried, a moisture measuring/operating station including a sampling means to sample automatically a fixed amount of materials dried in the drying means, a heat treatment chamber provided with an airtight heating means to heat the sampled materials, a moisture measuring unit which titrates and analyzes the moisture evaporated from the materials by means of a Karl Fischer reagent, and an operation unit in which the volume and the apparent specific weight of sampled materials are input and calculated together with the titrated value obtained by the moisture measuring unit to obtain the moisture content of the materials; and a temperature controller to control the temperature of the drying means so that the moisture content of the sampled materials obtained by the moisture measuring/operating station corresponds to a predetermined moisture content while comparing both moisture contents each time materials are sampled from the drying means.

Further, an on-line drying control system for powdered or granular materials is further characterized in that a fixed amount of materials is sampled from a drying means such as a hopper dryer by a pneumatic transporting means having an injection port of pressurized gas inside thereof and connected to a discharge port of the drying means and the materials are pneumatically transported into the moisture measuring/operating station by a small-caliber transport pipe.

This invention provides an on-line material transporting means wherein a fixed amount of materials dried in a drying means such as a hopper dryer is automatically sampled and fed into a moisture measuring/operating station to measure the moisture content by means of a Karl Fischer reagent. Such an on-line transporting means includes two methods; the materials are transported by the use of a mechanical material transporting means, and the materials are transported by a transport gas such as air or an inert gas.

A moisture measuring/operating station of the present invention uses a moisture measuring unit which executes a coulometric titration, a volumetric titration or a simple absorptive photometric titration which has been disclosed in Japanese Patent Application 63-039291, a Karl Fischer reagent being used for all those methods. See the discussion of FIG. 5 hereinafter.

The present invention discloses a moisture measuring/operating station wherein a measuring device is provided with a material sampling means to supply materials into a heat treatment chamber and a moisture measuring/operating station wherein a weight detection sensor is provided with a material measuring chamber above a heat treatment chamber instead of providing a measuring device to a material sampling means.

Materials are generally heated in the heat chamber of a moisture measuring/operating station by operating a heating means such as a heater. However, an energy saving system is simultaneously disclosed wherein the retained heat of the materials is utilized because the materials which have been already heated in the heat treatment chamber retain a large amount of heat.

Further in a moisture measuring/operating station, the analyzed value obtained by a moisture measuring unit which executes titration and analysis by the use of a Karl Fischer reagent and the weight value of dried materials before being heated in the heat chamber of the station or after being heated therein are calculated, whereby an accurate moisture content can be obtained. For this purpose, a weight measuring unit which measures the materials before being heated or the materials after being heated is proposed.

Furthermore, in a moisture measuring/operating station a dried inert gas is required to be introduced (or replaced) into a heat treatment chamber when powdered or granular materials are supplied into the heat chamber and heated for moisture analysis. For this purpose a feeding means which can supply an inert gas through a control damper provided under the heat treatment chamber or a second control damper provided under a material storing chamber is simultaneously disclosed.

Other and further objects, features and advantages of the invention will appear more fully from the following description.

DETAILED DESCRIPTION OF THE PREFERRED EMBODIMENT

Figure 1:
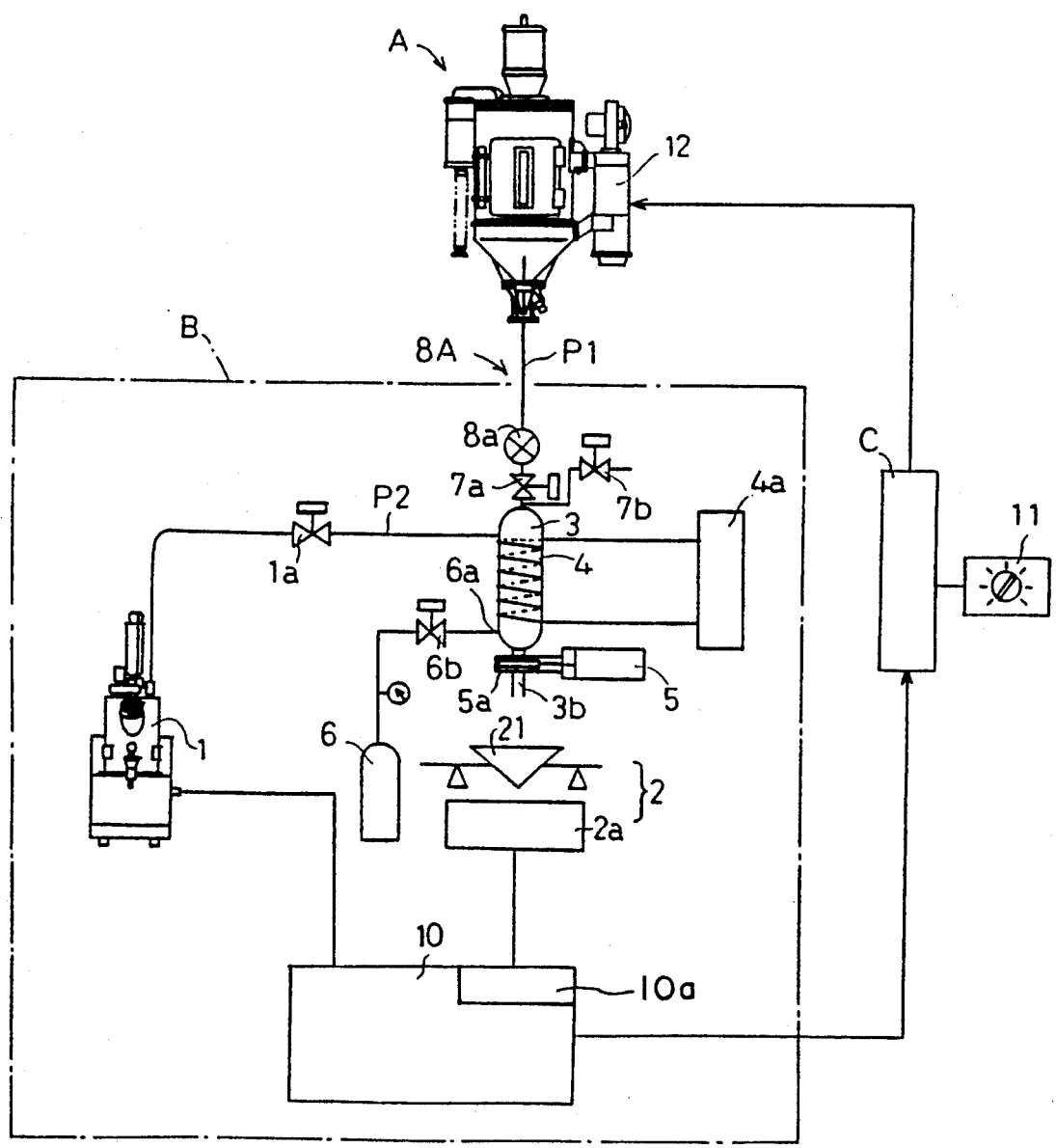
FIG. 1 is a schematic diagram showing one preferred embodiment according to the system of the present invention.

The system of FIG. 1 provides a transporting means wherein powdered or granular materials stored and dried in a hopper dryer A provided as a drying means are sampled by a rotary valve $8a$ forming a material sampling means 8A and supplied by gravity into a moisture measuring/operating station B.

In this system the moisture measuring/operating station B is constructed such that a heat treatment chamber 3 made of a heat-resistant glass provided with heating means 4 at its periphery is disposed under the rotary valve $8a$, and the valve $8a$ and the heat chamber 3 are connected by a transport pipe P1 having a control valve $7a$ to control the material supply and a vent valve $7b$ to open to atmosphere, the control valve $7a$ including a highly airtight valve disc to prevent the leakage of moisture produced when the materials are heated in the chamber 3.

A material discharge port $3b$ located under the chamber 3 is provided with a solenoid-operated control damper 5 which opens and closes the port $3b$ by reciprocating a valve disc $5a$. A weight measuring unit 2 is provided under the damper 5. The weight measuring unit 2 is equipped with a receiver 21 which can open and close to receive the heated materials discharged from the port $3b$ of heat chamber 3. When the materials are received in the receiver 21, its weight is automatically measured and is converted into an electrical signal at a signal processor $2a$ of the measuring unit 2. The thus converted data is sent to an operation unit 10.

The heat treatment chamber 3 has enough capacity to contain one sample of powdered or granular materials weighed by the rotary valve $8a$ and its upper part is connected with a branch pipe P2 having a control valve $1a$ and leading to a moisture measuring unit 1.

Many kinds of trace moisture measuring units using a Karl Fischer reagent which can be directly connected with the branch pipe P2 can be used as the moisture measuring unit 1. If such an unit is provided, a highly accurate coulometric or volumetric moisture measurement by means of a Karl Fischer reagent can be achieved by supplying the moisture evaporated by heating the materials into the unit together with an inert gas and by inputting the weight of the materials before heated.

The moisture measuring unit 1 in this embodiment executes a coulometric titration. The value titrated and analyzed by the unit 1 is converted into an electrical signal and sent to the operation unit 10, like the weight value measured by the weight measuring unit 2. Thus the value titrated and analyzed by the moisture measuring unit 1 and the weight value measured by the weight measuring unit 2 are input into the operation unit 10, the moisture content being calculated and sent to a temperature controller C.

The controller C is provided with a setting device 11 to set the most appropriate value for the moisture content of the materials by a dial or push-button operation, whereby the moisture content of the materials to be dried is set.

After the moisture content of the sampled materials is calculated in the operation unit 10, the controller C compares the obtained moisture content with the moisture content set by the setting device reads a data table prepared in advance for controlling temperature and controls the temperature of drying means A such as a hopper dryer by sending a control signal into a heating part 12 so as to compensate for the deviation of those moisture contents.

An inert gas feed port 6a is provided at the lower part of the heat chamber 3 in the moisture station B and connected through a control valve 6b to a gas source 6 which feeds an inert gas such as a dried nitrogen gas or helium gas.

The heat treatment chamber 3 is equipped with a heating means 4 at its periphery constructed by Nesa electrodes or a well-known Nichrome wire. If the heating means is constructed by Nesa electrodes, the materials in the heat chamber 3 can be seen through and also the body of chamber 3 can be made thin and compact.

The heat treatment chamber 3 is heated to and maintained at the temperature just before the stored materials are vaporized in order to evaporate all the moisture contained in the materials. For this purpose, a temperature control unit 4a sets and controls the most appropriate temperature of the chamber 3 before containing materials, depending on the materials to be heated therein.

According to this system, when sampling is required, the damper 5 is shut and the control valve 1a is closed to close the branch pipe P2 leading to the moisture measuring unit 1. At the same time the control valve 7a and the vent valve 7b are opened and the rotary valve 8a is driven to rotate while an inert gas is introduced into the chamber 3 by opening the control valve 6b, thus samples being supplied into the chamber 3. At this time the vent valve 7b is opened to atmosphere to prevent open air from entering into the chamber 3.

After a fixed amount of powdered or granular materials dried in the drying means is thus contained in the chamber 3, the control valve 7a and the vent valve 7b are closed with the damper 5 still closed. And the control valve 1a is opened to open the branch pipe P2 leading to the moisture measuring unit 1 while the control valve 6b is opened to introduce an inert gas from the lower part of chamber 3 into the inside thereof.

Under these conditions, powdered or granular materials are heated in the chamber 3 and the moisture produced by the evaporation of the heated materials is supplied into the moisture measuring unit 1 together with the introduced inert gas.

The supply of inert gas continues until the measuring unit 1 detects the end of titration. When the unit 1 detects its end, a display 10a of operation unit 10 shows a sign indicating the end of titration.

After the heat treatment of powdered or granular materials is thus finished, the materials in the chamber 3 are supplied into the weight measuring unit 2 by opening the control damper 5. In the unit 2 the materials received at the receiver 21 are weighed and the value is converted into an electrical signal by the signal processor 2a then sent to the operation unit 10, wherein data sent from the moisture measuring unit and the weight measuring unit 2 are calculated and the obtained moisture content of the materials is monitored and shown on the display 10a of the operation unit 10.

The moisture content of sampled materials thus calculated in the operation unit 10 is sent to the temperature controller C in the form of an electrical signal and compared with the moisture content set by the setting device 11. A heat control signal to compensate for the deviation of the two moisture contents is sent to the heating part 12 of drying means consequently, the materials in the drying means A are heated and dried so as to get the moisture content set by the setting device 11.

Figure 2:
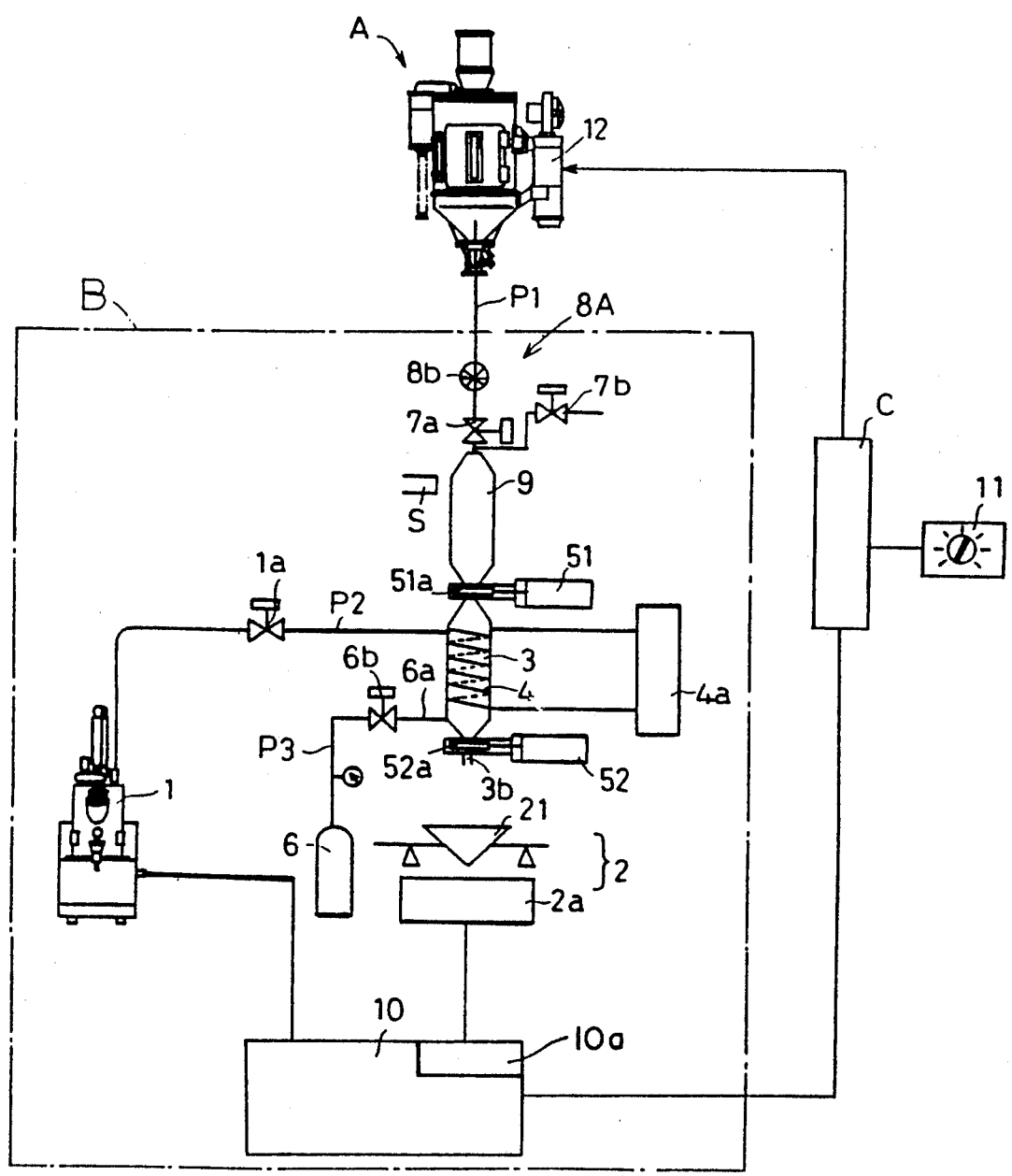
FIG. 2 is a schematic diagram showing another preferred embodiment according to the system of the present invention.

In the system of FIG. 2 a rotary valve 8b in a material supply means 8A of moisture measuring/operating station B doesn't work as a measuring device. A fixed amount of powdered or granular materials is weighed by a material measuring chamber 9 having a weight detection sensor S to detect the level of materials and provided between the material supply means 8A and a heat treatment chamber 3.

Materials are supplied into the material measuring chamber 9 by opening a control valve 7a until the sensor S detects that supplied materials reach a determined level. After a fixed amount of materials is stored in the chamber 9, the materials are supplied into the heat chamber 3 by opening a first control damper 51 provided between the measuring chamber 9 and the heat chamber 3.

A second control damper 52 to discharge the heated materials and a weight measuring unit 2 are provided under the heat treatment chamber 3, the materials heated to be titrated and analyzed being weighed by the measuring unit 2.

An operation unit 10 calculates data sent from a moisture measuring unit 1 and the weight measuring unit 2 and indicates the obtained moisture content of the materials on its display 10a. The remaining components are the same as the above-mentioned first system.

Figure 3:
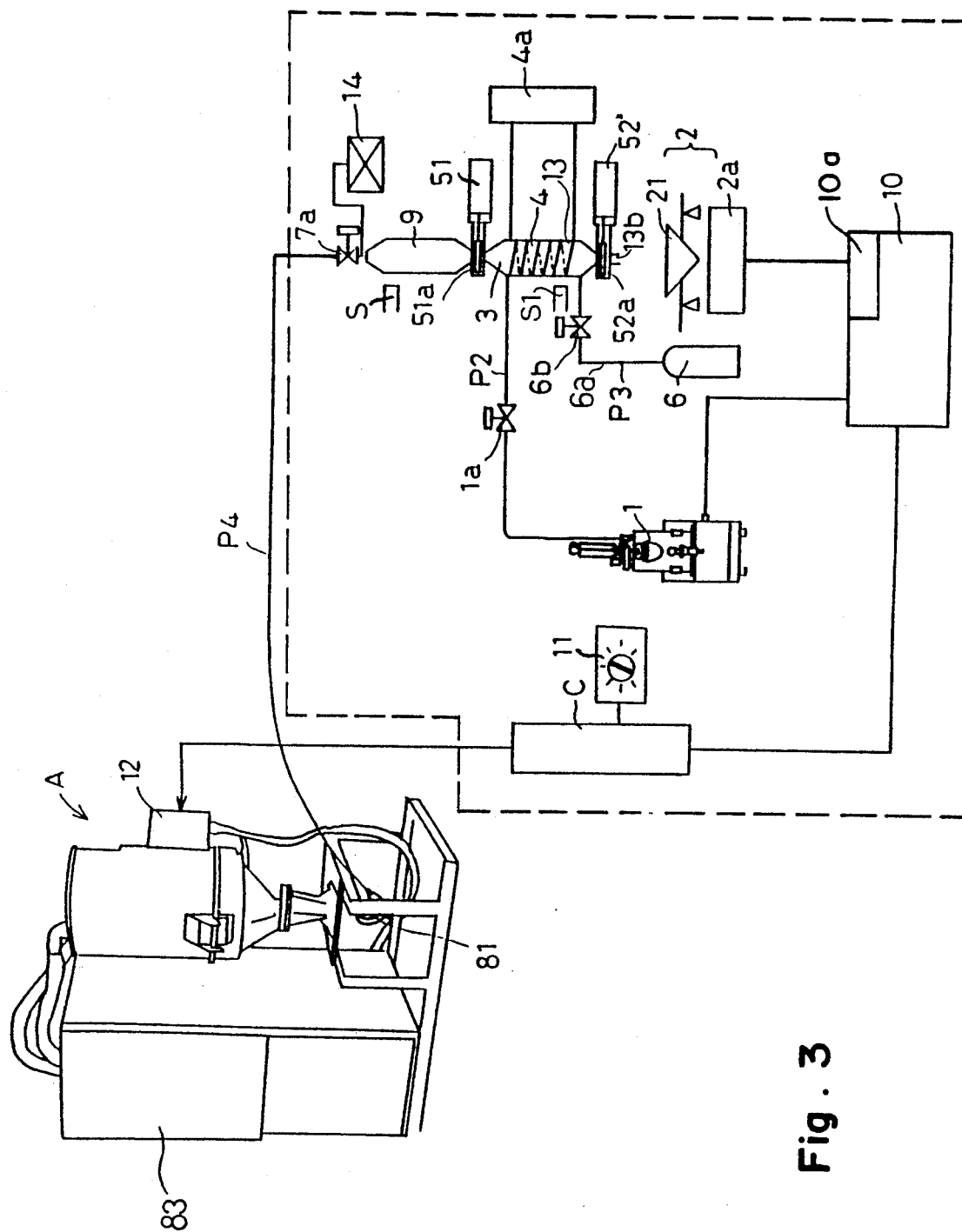
FIG. 3 is a schematic diagram showing still another preferred embodiment according to the system of the present invention.

The system of FIG. 3 is characterized by a pneumatic transporting means 81 having an injection nozzle equipped at a discharge port provided at the lower part of a hopper dryer A as a drying means. Powdered or granular materials are taken out of the hopper dryer A by feeding a pressurized gas into the transporting means 81 and supplied through a transport pipe line P4 by a pneumatic transportation into a moisture measuring-/operating station B. The numeral 83 indicates a unit to dehumidify and dry a gas to be supplied into the hopper dryer A.

The materials pneumatically transported by a pressurized gas by the use of such a transporting means 81 are separated from the gas by a filtering device 14 provided at the entrance of a measuring chamber 9 of the moisture measuring/operating station B. A capacitance level sensor S is provided with the measuring chamber 9 as a weight detection sensor, the sensor S controlling opening and closing operations of a control valve 7a to store a fixed amount of materials in the chamber 9.

A fixed amount of materials stored in the chamber 9 falls into a heat treatment chamber 3 to be stored therein by opening a first control damper 51. At this time an inert gas introduced from a feed port 6a provided at the lower part of the heat chamber 3 is bled to atmosphere from the filtering device 14 passing through the heat chamber 3 and the measuring chamber 9. Therefore, outer air is prevented from entering both chambers 3 and 9 and they can be kept under dried circumstances which are suitable for titrating and analyzing moisture content.

The pneumatic transporting means 81 according to this system includes the pressurized gas injection nozzle provided at the initial end side of the discharge port of the hopper dryer (gas source side) and materials are drawn by injecting a pressurized gas from the nozzle by operating the gas source (not illustrated), that is well known as an ejecting effect.

Such a pneumatic transporting means 81 is known. Materials stored in the hopper A are taken out into the transport pipe line P4 and transported pneumatically when a pressurized gas injected from the nozzle creates negative pressure at the discharge port side of hopper A by the effect of ejection. This transporting means 81 is free from clogging caused at the beginning of the suction operation because the apparent area of the suction port becomes larger than that of a conventional suction nozzle having the same caliber, whereby a small amount of materials can be pneumatically transported by the use of a thin transport pipe.

The system in FIG. 3 is also characterized by including a material storing chamber 13 to store at least more than one sample of materials provided under the heat treatment chamber 3 in the moisture measuring/operating station B.

A layer of powdered or granular materials to be heated is piled on a layer of materials stored in the storing chamber 13 and heated in the chamber 3. After the materials of the upper layer are heated in the chamber 3, the materials in the storing chamber 13 are discharged by gravity when a valve disc 52a of control damper 52 is opened. A level sensor S1 is provided with the storing chamber 13 as a weight detection sensor in order to control the amount of discharge, whereby immediately after one sample of materials is discharged, the valve disc 52a of the damper 52 is closed, control valves 7a and 6b are opened and an inert gas is introduced into the chamber 13. At the same time a fixed amount of materials newly sampled by the pneumatic transporting means 81 is supplied into the heat treatment chamber 3.

According to this system in which the material storing chamber 13 is provided under the heat treatment chamber 3, powdered or granular materials which have been already heated are stored in the storing chamber 13. Therefore, the chamber 3 is prevented from losing heat by the supply of materials, and the retained heat of the materials can be applied to the above layer of materials, whereby an energy-saving system and quick analysis can be achieved.

Further according to this system, an inert gas is introduced into the heat chamber 3 by opening the control valve 6b when a new sample of materials is supplied. So, this system is more effective in achieving a uniform temperature in the heat chamber 3 because the inert gas works as a medium to transfer the heat of the materials which have been already heated and also maintains the temperature in the chamber 3.

Furthermore according to this system, the weight of the materials may be measured before being heated by sampling a fixed amount of materials and feeding through the chamber 3 without executing a heat treatment into the weight measuring unit 2. In this case, as the weight of the materials measured by the measuring unit 2 differs from that of the heated materials, the average weight of the sampled materials, which are not heated, taken out at a few times may be used as the weight data in order to consider the difference between both weights.

Figure 4:
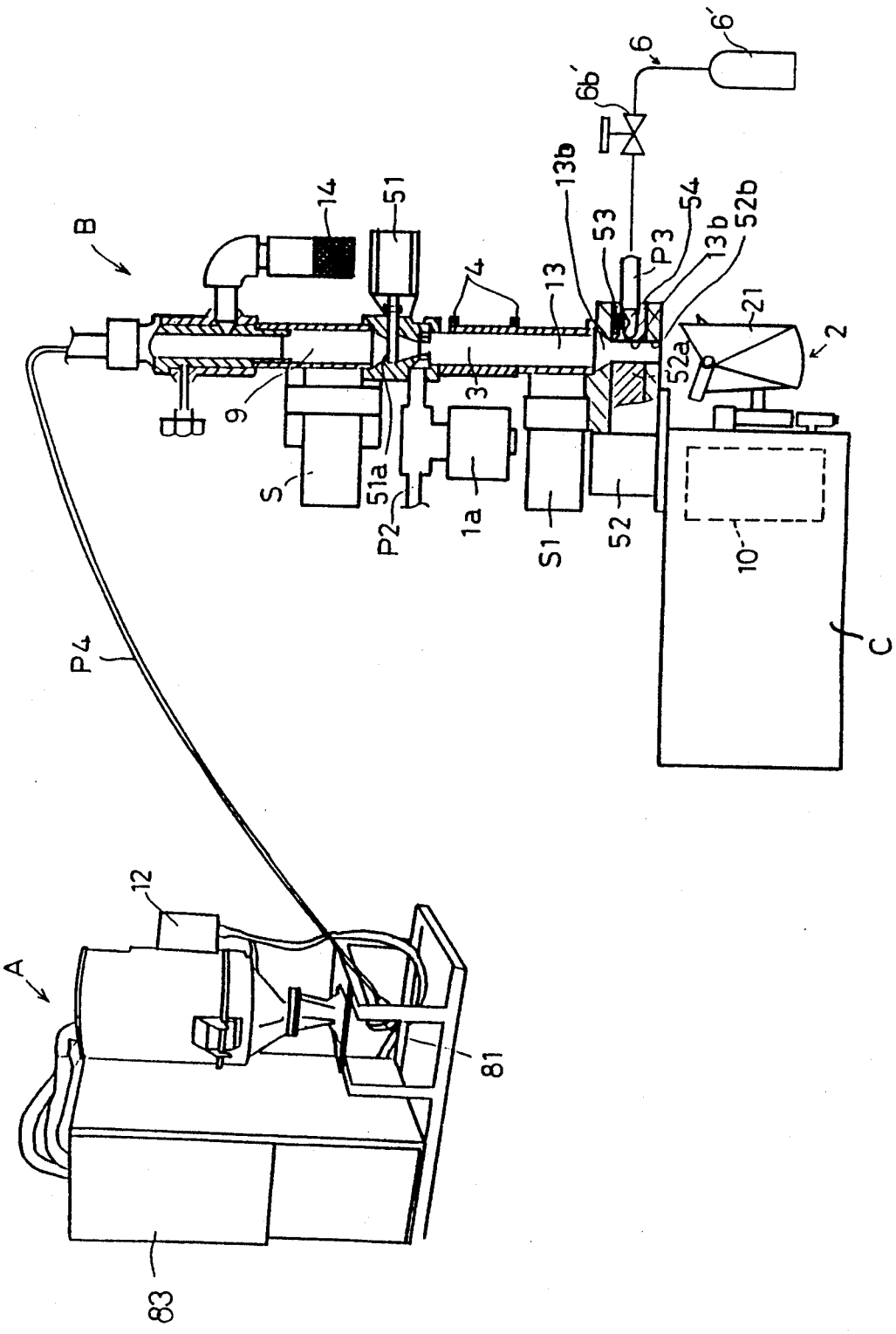
FIG. 4 illustrates the partially enlarged sectional view of another preferred construction of a moisture measuring/operating station of the system of the present invention.

FIG. 4 illustrates the partially enlarged sectional view of another preferable construction of moisture measuring/operating station B.

A pneumatic transporting means 81 is provided at a discharge port at the lower part of hopper dryer A, constructed as the drying means, and the upstream end of a transport pipe line P4 extending from the transporting means 81 is connected to a feed port formed at the upper end of material measuring chamber 9 of material measuring/operating station B.

The station B includes a heat treatment chamber 3 having a heating means 4 constructed by winding a Nichrome wire under the material measuring chamber 9 interposed by a first control damper 51, a material storing chamber 13, described heretofore, provided under the heat chamber 3, a second control damper 52 under the chamber 13, and a weight measuring unit 2 having a receiver 21 to receive powdered or granular materials discharged from a material discharge port 13b of the storing chamber 13 under the damper 52.

Capacitance level sensors S and S1 are provided as a weight detection sensor for the measuring chamber 9 and the storing chamber 13 respectively. The transport pipe line P4 connected with the transporting means 81 at its downstream end is connected to the upper end of measuring chamber 9, and a filtering unit 14 for separation the transported materials from a pressurized gas is provided at the side of the chamber 9.

The first control damper 51 provided between the measuring chamber 9 and the heat chamber 3 includes a solenoid-operated highly airtight valve disc 51a. The solenoid-operated second control damper 52 disposed under the storing chamber 13 is constructed so as to be able to introduce an inert gas by filling a breathable ceramic material 53 in a gas introduction pipe 54 even if a valve disc 52a is closed, as described hereinafter. The numeral 1a indicates a control valve interposed in the branch pipe P2 leading to a moisture measuring unit 1 (illustrated in FIG. 3) from the upper part of heat treatment chamber 3.

The temperature control for the drying means is executed similar to the system shown in FIG. 1. For this purpose the temperature controller C is provided with the setting device 11 for moisture content, receiving the signal from the operation unit 10 of moisture measuring/operating station B and sending a control signal to the heating part 12 of drying means A.

The valve disc 52a of control damper 52 is provided with a valve port 52b to discharge the materials and is filled with the breathable ceramic material 53 so as to close a material discharge port 13b constructed under the heat chamber 3 when the valve disc 52a is at its closed position. The gas introduction pipe 54 having one opened end is provided with the ceramic material 53 and the opening of the pipe 54 is connected with a gas feed pipe P3' leading to a pressurized and dried inert gas source 6'.

According to such a construction, as the valve port 52b conforms to the discharge port 13b when the damper 52 is opened, powdered or granular materials contained in the chamber 13 are discharged by gravity through the port 13b. When the damper 52 is closed, the ceramic material 53 closes the port 13b and prevents the discharge of materials. However, an inert gas entering from the gas introduction pipe 54 successively goes into the heat chamber 3 because the gas can pass through the ceramic material 53, thus the replacement by an inert gas, as described heretofore, and the supply of inert gas when materials are heated can be achieved.

In the above-mentioned embodiments a construction in which sampled materials are weighed before being heated or after being heated by the weight measuring unit 2 is explained. However, such a weight measuring unit 2 may be removed and the apparent specific weight and the volume of sampled materials may be input into an operation unit 10. Such a system can further simplify the construction thereof because of the removal of weight measuring unit 2 and is more effectively used for the moisture control of the same kind of powdered or granular materials.

In this case, the system may be preferably constructed such that the volume of sampled materials is input into the operation unit 10 automatically.

According to an on-line drying control method for powdered or granular materials of the present invention, a fixed amount of materials dried in a drying means is automatically sampled, transported into a moisture measuring/operating station including an airtight and dried heat treatment chamber and measured the moisture content thereof in an operation unit. Thus obtained moisture content is sent to a temperature controller and compared with a predetermined moisture content, whereby the temperature of drying means is controlled so that the materials therein reach a predetermined moisture content.

On-line drying control systems for powdered or granular materials simultaneously proposed according to the present invention have the following functions.

In a moisture measuring/operating station of this system, the sampled materials are titrated and analyzed by means of a Karl Fischer reagent and weighed. A temperature controller executes a feedback control wherein the moisture content of the materials is directly controlled based on the moisture content obtained by calculating those measured values.

And, in a moisture measuring/operating station of an on-line drying control system for powdered or granular materials, the titrated and analyzed value of sampled materials measured by means of a Karl Fischer reagent and the volume and the apparent specific weight of sampled materials are input into an operation unit. A temperature controller executes a feedback control wherein the moisture content of the materials is directly controlled based on the moisture content obtained by the operation unit.

Further, in an on-line drying control system for powdered or granular materials, materials are pneumatically transported from a drying means such as a hopper dryer by a pneumatic transporting means having a pressurized gas injection port provided under the drying means, whereby a pneumatic transportation by means of a thin pipe which is free from clogging at the beginning of the suction operation can be achieved.

As is apparent from the above-mentioned explanations, the following effects can be achieved by the present invention.

According to an on-line drying control method for powdered or granular materials of the present invention, the operation in which a fixed amount of materials dried in a drying means such as a hopper dryer is automatically sampled and transported into a moisture measuring/operating station including an airtight heat treatment chamber and the moisture content thereof measured, and the operation of controlling the temperature of drying means to keep the most appropriate temperature based on the obtained moisture content can be executed on-line, simply and precisely.

And according to on-line drying control systems for powdered or granular materials of the present invention, the materials dried in a drying means are automatically sampled and the moisture content thereof measured. An on-line feedback control system to control the temperature of the drying means most appropriately while the obtained moisture content of the materials is compared with a predetermined moisture content can be achieved.

Further, according to an on-line drying control system for powdered or granular materials, materials can be pneumatically transported without clogging at the beginning of a suction operation by means of a thin pipe and a small amount of materials can be transported by a small-caliber pipe. Consequently, an on-line drying control system which is preferably used in a molding site where a small amount and many kinds of resin materials are frequently exchanged can be fulfilled.

Figure 5:
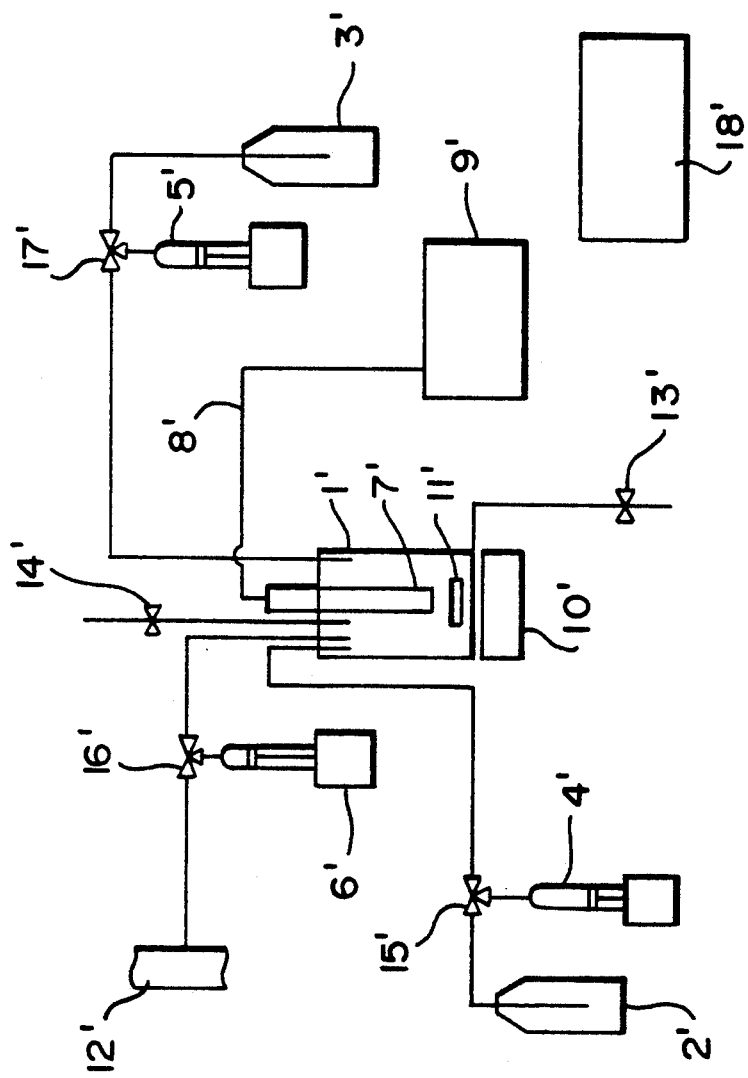
FIG. 5 is a block diagram of a moisture measuring unit in which a Karl Fischer reagent is used.

As noted above, FIG. 5 is a block diagram of a moisture measuring unit in which a Karl Fischer reagent is used. In FIG. 5, the numeral 1' indicates a reservoir for measuring moisture content, 2' is a reservoir for a Karl Fischer reagent, 3' is a reservoir for a solvent, 4' is a unit to supply a fixed amount of a Karl Fischer reagent, 5' is a unit to supply a fixed amount of a solvent, 6' is a unit to supply a fixed amount of a sample, 7' is a sensor for measuring absorbance, 8' is an optical fiber, 9' is an absorptiometer, 10' is an electromagnetic agitator, 11' is an agitating piece, 12' is a sample source, 13' is a discharge valve, 14' is an introduction valve for dry gas, and 15', 16' and 17' are 3-way valves.

According to such a moisture measuring unit, moisture measurements are achieved by noting that the titer of a Karl Fischer reagent and the absorbance of iodine (I), especially the absorbance at around 560 m$\mu$, have a straight line rotation.

According to the moisture measuring unit, the following processes are executed.

a) a sample solution preparing process wherein a fixed amount of a Karl Fischer reagent and a fixed amount of a solution are introduced into a moisture measuring reservoir and a uniform reagent solution is made therein:

b) a pre-measuring process for measuring absorbance based on iodine in the reagent solution;

c) a reaction process for introducing a fixed amount of a sample into the reagent solution and reacting moisture and iodine in the reagent solution; and d) a post-measuring process for measuring the absorbance based on iodine in the reagent solution after the reaction.

The moisture content of the sample is obtained based on the amount of the Karl Fischer reagent introduced into the moisture measuring reservoir, the amount of the solvent, the amount of the reagent, the value obtained by the pre-measuring process, and the value obtained by the post-measuring process.

The moisture measuring method according to this unit is different from that of a conventional titration method using a Karl Fischer reagent. In the present method, an excessive amount of the Karl Fischer reagent and the sample are reacted in order that iodine in the Karl Fischer reagent remains after the reaction. Then moisture content is obtained based on the absorbance of the iodine in the residual Karl Fischer reagent after the reaction. (The change of the absorbance based on the change of the volume of the Karl Fischer reagent before and after the reaction is compensated).

At first, a fixed amount of a Karl Fischer reagent and a fixed amount of a solvent are put into a moisture measuring reservoir and agitated to make a uniform reagent solution. Karl Fischer reagent SS [MITSUBISHI] can be used as a Karl Fischer reagent and Dehydration Solvent MS [MITSUBISHI] can be used as a solvent. (Both are products of Mitsubishi Chemical Co., Ltd.)

A suitable reservoir having a window for measuring absorbance can be used as a measuring reservoir. When a sensor using an optical fiber for measuring absorbance is used, a suitable airtight reservoir which is unaffected by the moisture in the air can be used.

The iodine in the reagent solution indicates continuous absorption from about 600 m$\mu$ to the ultraviolet area. Therefore, an absorbance at a suitable point, for example at 545 m$\mu$, is measured.

Then, a fixed amount of a sample is introduced in to the reagent solution and the solution is agitated to react so that a uniform solution is obtained. The amount of the sample to be introduced must be settled so that a Karl Fischer reagent remains after a Karl Fischer reagent and moisture react. After the reaction is finished, the absorbance at the same wavelength as the pre-measurement is measured. And the moisture content of the sample is calculated as follows:

$$\text{moisture content } (\mu g/ml) = 1/k \cdot S \; [(M+K)A_1 - (S+M+K)A_2]$$

S: Introduced amount of a sample (ml)
M: Introduced amount of a solvent (ml)
K: Introduced amount of a Karl Fischer reagent (ml)
$A_1$: absorbance before a sample is introduced
$A_2$: absorbance after a sample is introduced
k: invariable According to the moisture measuring unit, a construction of the unit is simple and maintenance is easy because the unit consists of means for measuring a fixed amount of a Karl Fischer reagent, a fixed amount of a solvent and a fixed amount of sample respectively and for introducing each of them into a reservoir and a means for measuring absorbance. Further, the measuring accuracy isn't affected if the titer of a Karl Fischer reagent is changed with time. Accordingly, the present moisture measuring unit is preferably used for a process analysis method.

It is further understood by those skilled in the art that the foregoing description is a preferred embodiment of the present invention and that various changes and modifications may be made in the invention without departing from the spirit and scope thereof.

What is claimed is:

1. An on-line drying control method for powdered materials having a moisture content, comprising the steps of:
    (a) sampling powdered materials stored and dried in a drying means;
    (b) transporting the sampled materials into an airtight heat treatment chamber provided with heating means in a moisture measuring/operating station;
    (c) heating the transporting materials in said heat treatment chamber while feeding a pressurized and dried inert gas thereinto;
    (d) supplying moisture generated from the heated materials into a moisture measuring unit together with the inert
    (e) calculating the moisture content of the materials by repeating the above-mentioned steps (b)–(d) each time materials are sampled from said drying means; and
    (f) controlling the temperature of said drying means so that the calculating moisture content of materials corresponds to a predetermined moisture content while comparing both moisture contents.

2. An on-line drying control system for powdered materials having a moisture content, comprising:
    (a) drying means to store powdered materials for drying;
    (b) a moisture measuring/operating station including sampling means to sample a fixed amount of materials dried in said drying means,
    an airtight heat treatment chamber provided with heating means to heat the sampled materials,
    a moisture measuring unit to titrate and analyze the moisture evaporated from the heated materials by means of a titration reagent,
    a weight measuring unit to measure the materials, and
    an operation unit which calculates a titrated value obtained by said moisture measuring unit and a weight value measured by said weight measuring unit to obtain the moisture content of the materials; and
    (c) a temperature controller to control the temperature of said drying means so that the moisture content of the materials obtained by said moisture measuring/operating station corresponds to a predetermined moisture content while comparing both moisture contents each time materials are sampled from said drying means.

3. An on-line drying control system for powdered materials having a moisture content, comprising:
    (a) drying means to store powdered materials for drying;
    (b) a moisture measuring/operating station including sampling means to sample a fixed amount of materials dried in said drying means,
    an airtight heat treatment chamber provided with heating means to heat the sampled materials,
    a moisture measuring unit to titrate and analyze the moisture evaporated from the heated materials by means of a titration reagent, and
    an operation unit in which volume and apparent specific weight of materials are input and calculated together with a titrated value obtained by said moisture measuring unit to obtain the moisture content of the materials; and
    (c) a temperature controller to control the temperature of said drying means so that the moisture content of the materials obtained by said moisture measuring/operating station corresponds to a predetermined moisture content while comparing both moisture contents each time materials are sampled from said drying means.

4. An on-line drying control system for powdered materials having a moisture content, comprising:
    (a) drying means to store powdered materials for drying:
    (b) a moisture measuring/operating station including sampling means to sample a fixed amount of materials dried in said drying means,
    an airtight heat treatment chamber provided with heating means to heat the sampled materials,
    a moisture measuring unit to titrate and analyze the moisture evaporated from the heated materials by means of a titration reagent,
    a weight measuring unit to measure the materials, and
    an operation unit which calculates a titrated value obtained by said moisture measuring unit and a weight value measured by said weight measuring unit to obtain the moisture content of the materials;

(c) a pneumatic transporting means having an injection port of pressurized gas at a discharge port of said drying means, so that a fixed amount of materials is sampled from said drying means and pneumatically transported into said moisture measuring/operating station; and (d) a temperature controller to control the temperature of said drying means so that the moisture content of the materials obtained by said moisture measuring/operating station corresponds to a predetermined moisture content while comparing both moisture contents each time materials are sampled from said drying means.

5. An on-line drying control system for powdered materials having a moisture content, comprising:

(a) drying means to store powdered materials for drying;

(b) a moisture measuring/operating station including sampling means to sample a fixed amount of materials dried in said drying means, an airtight heat treatment chamber provided with heating means to heat the sampled materials, a moisture measuring unit to titrate and analyze the moisture evaporated from the heated materials by means of a titration reagent, and an operation unit in which volume and apparent specific weight of materials are input and calculated together with a titrated value obtained by said moisture measuring unit to obtain moisture content of materials;

(c) a pneumatic transporting means having an injection port of pressurized gas at a discharge port of said drying means, so that a fixed amount of materials is sampled from said drying means and pneumatically transported into said moisture measuring/operating station; and (d) a temperature controller to control the temperature of said drying means so that the moisture content of the materials obtained by said moisture measuring/operating station corresponds to a predetermined moisture content while comparing both moisture contents each time materials are sampled from said drying means.

6. An on-line drying control method for granular materials having a moisture content, comprising the steps of:

(a) sampling granular materials stored and dried in a drying means;

(b) transporting the sampled materials into an airtight heat treatment chamber provided with heating means in a moisture measuring/operating station;

(c) heating the transported materials in said heat treatment chamber while feeding a pressurized and dried inert gas thereinto;

(d) supplying moisture generated from the heated materials into a moisture measuring unit together with the inert gas;

(e) calculating the moisture content of the materials by repeating the above-mentioned steps (b)-(d) each time materials are sampled from said drying means; and (f) controlling the temperature of said drying means so that the calculated moisture content of materials corresponds to a predetermined moisture content while comparing both moisture contents.

7. An on-line drying control system for granular materials having a moisture content, comprising:

(a) drying means to store granular materials for drying;

(b) a moisture measuring/operating station including sampling means to sample a fixed amount of materials dried in said drying means, an airtight heat treatment chamber provided with heating means to heat the sampled materials, a moisture measuring unit to titrate and analyze the moisture evaporated from the heated materials by means of a titration reagent, a weight measuring unit to measure the materials, and an operation unit which calculates a titrated value obtained by said moisture measuring unit and a weight value measured by said weight measuring unit to obtain the moisture content of the materials; and (c) a temperature controller to control the temperature of said drying means so that the moisture content of the materials obtained by said moisture measuring/operating station corresponds to a predetermined moisture content while comparing both moisture contents each time materials are sampled from said drying means.

8. An on-line drying control system for granular materials having a moisture content, comprising:

(a) drying means to store granular materials for drying;

(b) a moisture measuring/operating station including sampling means to sample a fixed amount of materials dried in said drying means, an airtight heat treatment chamber provided with heating means to heat the sampled materials, a moisture measuring unit to titrate and analyze the moisture evaporated from the heated materials by means of a titration reagent, and an operation unit in which volume and apparent specific weight of materials are input and calculated together with a titrated value obtained by said moisture measuring unit to obtain the moisture content of the materials; and (c) a temperature controller to control the temperature of said drying means to that the moisture content of the materials obtained by said moisture measuring/operating station corresponds to a predetermined moisture content while comparing both moisture contents each time materials are sampled from said drying means.

9. An on-line drying control system for granular materials having a moisture content, comprising:

(a) drying means to store granular materials for drying:

(b) a moisture measuring/operating station including sampling means to sample a fixed amount of materials dried in said drying means, an airtight heat treatment chamber provided with heating means to heat the sampled materials, a moisture measuring unit to titrate and analyze the moisture evaporated from the heated materials by means of a titration reagent, a weight measuring unit to measure the materials, and an operation unit which calculates a titrated value obtained by said moisture measuring unit and a weight value measured by said weight measuring unit to obtain the moisture content of the materials;

(c) a pneumatic transporting means having an injection port of pressurized gas at a discharge port of said drying means, so that a fixed amount of materials is sampled from said drying means and pneumatically transported into said moisture measuring-/operating station; and (d) a temperature controller to control the temperature of said drying means so that the moisture content of the materials obtained by said moisture measuring/operating station corresponds to a predetermined moisture content while comparing both moisture contents each time materials are sampled from said drying means.

10. An on-line drying control system for granular materials having a moisture content, comprising:

(a) drying means to store granular materials for drying;

(b) a moisture measuring/operating station including sampling means to sample a fixed amount of materials dried in said drying means, an airtight heat treatment chamber provided with heating means to heat the sampled materials, a moisture measuring unit to titrate and analyze the moisture evaporated from the heated materials by means of a titration reagent, an operation unit in which volume and apparent specific weight of materials are input and calculated together with a titrated value obtained by said moisture measuring unit to obtain moisture content of materials;

(c) a pneumatic transporting means having an injection port of pressurized gas at a discharge port of said drying means, so that a fixed amount of materials is sampled from said drying means and pneumatically transported into said moisture measuring-/operating station; and (d) a temperature controller to control the temperature of said drying means so that the moisture content of the materials obtained by said moisture measuring/operating station corresponds to a predetermined moisture content while comparing both moisture contents each time materials are sampled from said drying means.

* * * * *

UNITED STATES PATENT AND TRADEMARK OFFICE
CERTIFICATE OF CORRECTION

PATENT NO. : 5,165,180

DATED : November 24, 1992

INVENTOR(S) : Hiroshi Ogiri et al

It is certified that error appears in the above-identified patent and that said Letters Patent is hereby corrected as shown below:

Claim 1, column 11, line 55, "transporting" should be "transported";
line 60, "gas;" should be inserted after "inert"; and
line 66, "calculating" should be "calculated".

Claim 4, column 12, line 55, ":" should be ";".

Claim 8, column 14, line 46, "to" should be "so".

Claim 9, column 14, line 55, ":" should be ";".

Claim 10, column 16, line 5, "and" should be inserted after ",".

Signed and Sealed this

Twenty-sixth Day of October, 1993

Attest:

BRUCE LEHMAN

*Attesting Officer*    Commissioner of Patents and Trademarks